June 22, 1971 L. M. HARVEY Re. 27,147

LANDING MAT

Original Filed March 8, 1968 4 Sheets-Sheet 1

INVENTOR.
LEO M. HARVEY
BY Donald Tannenwald
ATTORNEY

LANDING MAT

Original Filed March 8, 1968 4 Sheets-Sheet 2

INVENTOR.
LEO M. HARVEY
BY Donald Townsend
ATTORNEY

LANDING MAT

Original Filed March 8, 1968 4 Sheets-Sheet 3

INVENTOR.
LEO. M. HARVEY
BY Donald Townsend
ATTORNEY

LANDING MAT
Original Filed March 8, 1968 4 Sheets-Sheet 4
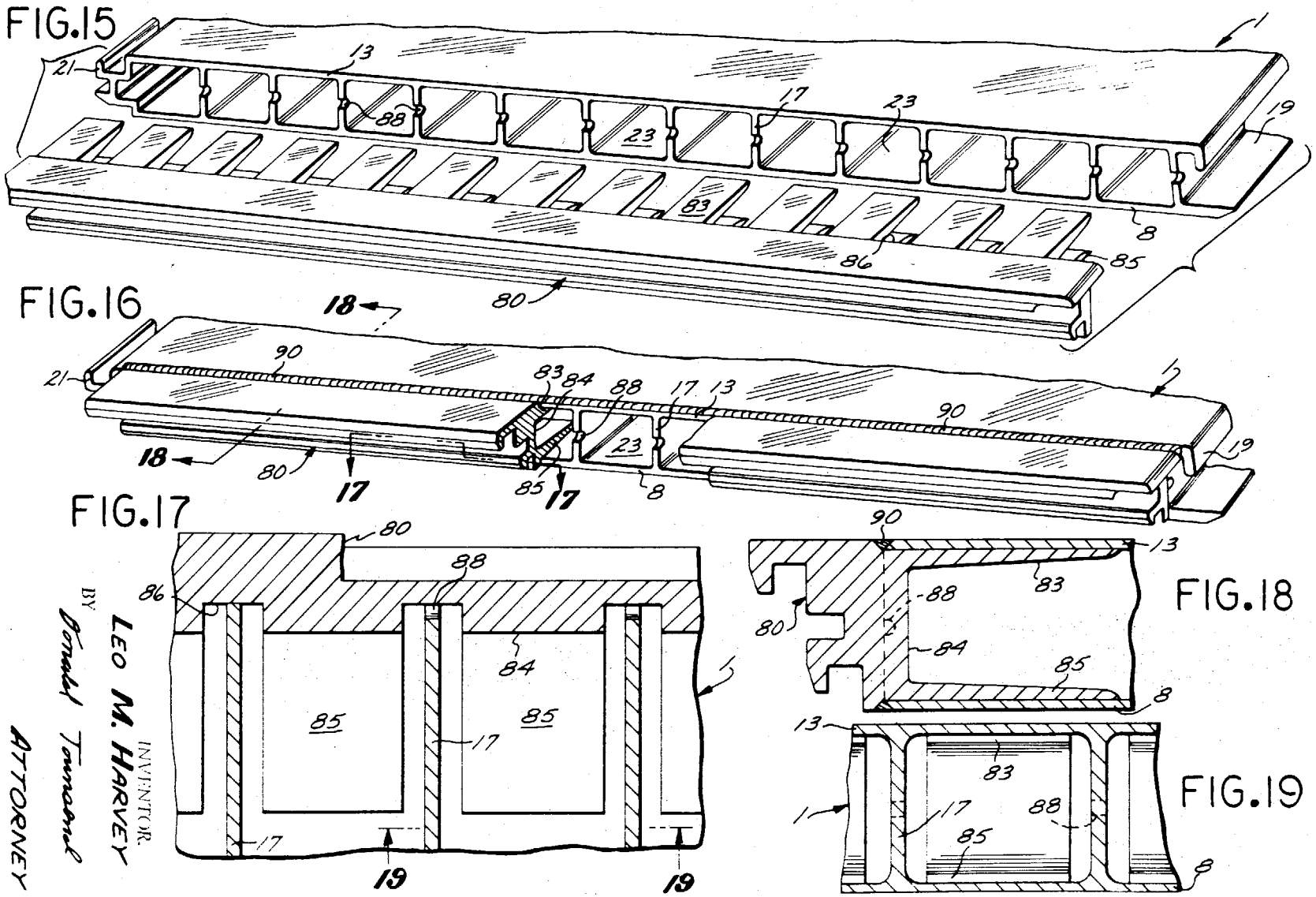
INVENTOR.
LEO M. HARVEY
BY Donald Townsend
ATTORNEY United States Patent Office Re. 27,147
Reissued June 22, 1971

27,147
LANDING MAT

Leo Myer Harvey, Los Angeles, Calif., assignor to Harvey Aluminum (Incorporated), Torrance, Calif.

Original No. 3,450,010, dated June 17, 1969, Ser. No. 711,681, Mar. 8, 1968. Application for reissue Nov. 4, 1969, Ser. No. 870,653
Int. Cl. E01c *5/00*
U.S. Cl. 94—13 21 Claims

Matter enclosed in heavy brackets [ ] appears in the original patent but forms no part of this reissue specification; matter printed in italics indicates the additions made by reissue.

ABSTRACT OF THE DISCLOSURE

This invention relates to extruded metal landing mats having deck and base plates spaced by means of parallel ribs with pre-formed complementary end connectors being welded to opposite ends of the mat. The end of the mat is reinforced by inserting into the channels between adjacent ribs a hollow plug having an end wall coextensive with end of the ribs; the end connected then being electron beam welded over its entire rear face to the end wall of the plug and the end of the ribs, deck, and base plates.

In conventional detachable interlocking matting, preformed complementary male and female connectors are welded across opposite ends of each mat section (see U.S. Patent No. 3,172,508). When landing aircraft touch down at or near the end of a plank and/or a landing occurs on a section of matting overlying soil sufficiently unstable to support the load, greater elastic deformation can occur in the body of the mat than in the more rigid end connector with resulting weld failure and damage to the plank. Even normal aircraft traffic over the end of a plank causing repated transverse flexure thereof results in splitting or peeling of the upper deck plate from the mat structure. To avoid a tire puncture or other mishap by aircraft landing on damaged matting, the runway must be inspected frequently and damaged mat sections either rewelded or entirely replaced.

To improve the strength and durability of matting, it has been proposed to reinforce the extruded mat body by inserting into the end of each channel therein a relatively short tubular element (see U.S. Patent No. 3,319,543). This tubular element is welded to adjacent ribs, the deck and base plates are beveled, and the end connector is then welded to the beveled end of the plank and exposed edges of the tubular element. Since these tubular elements serve only to reinforce the extruded body of the mat without strengthening to any degree the bond holding the end connector thereto, repeated impact loading at the end of these reinforced planks still results in rupture of the weld and separation of the end connector from the plank.

It is therefore a principal object of the invention to provide an improved and more durable matting assembled from a plurality of mat sections each capable of sustaining repeated impact loading without failure;

Another object is to provide an improved means of reinforcing both the end of the mat body and the weld securing an end connector thereto;

Yet another object is to provide an improved end connector having integrally formed thereon a means of reinforcing the end of the mat body;

Still another object is to provide an improved process of welding an end connector to a reinforced mat section.

These and other objects and advantages of the invention will become apparent upon reference to the following description, drawings, and claims appended hereto.

According to a preferred embodiment of the invention, the end of the mat is reinforced by slidably inserting into the channels a relatively short hollow plug means having an end wall which closes off at least a portion of the channel. The rectangular plug means having peripheral walls conforming closely in cross-section to that of the channels is dimensioned to fit slidably therein. Satisfactory reinforcement of the mat is obtained with such plug means having a length at least equal to the over-all mat thickness, it being preferred to employ plugs having a length of from about 1.25 to 2 times the over-all mat thickness.

After positioning within the channels the plug means with their end wall coextensive with the end of the plank, an end connector is welded thereto. Although conventional welding techniques can be used in securing the end connector to the mat body, it is preferred to employ an electron beam welder, the electron beam being passed transversely through the mat to produce a continuous weld between the end connector, the ends of the extruded mat body, and the end wall of the plug means.

Mat sections fabricated according to the present invention have surprisingly been found to withstand severe impact loading without a failure in either the body portion of the mat or in the weld securing the end connector thereto. In the case of mat sections welded with an electron beam, where the weld shear area is 3 to 4 times greater than in conventional matting, the fatigue life of the matting is unexpectedly increased by as much as two to three hundred percent.

In another preferred embodiment of the invention, the end of the mat body is reinforced by a plurality of finger-like projections extending from the back of the end connector means into the mat channels. For maximum reinforcement, a pair of spaced parallel projections extend into each of the mat channels, one of the pair of projections being in sliding contact with the underside of the deck plate and the other projection being in sliding contact with the upper surface of the base plate. These finger-like projections which are formed integral with the extruded end connector means extend into the channels a distance at least equal to the over-all mat thickness, and preferably a distance of from about 1.25 to 2 times the over-all mat thickness.

With these finger-like projections of the end connector means being used for reinforcement of the mat body, conventional welding techniques can be used in securing the deck and base plates to the end connector means. Even more satisfactory results can be obtained by using an electron beam to weld the end connector means to the mat body, the electron beam producing an increased weld area by fusin gthe end of the ribs to the end connector means.

The invention will be more fully understood from the following detailed description of preferred embodiments illustrated in the drawings, in which:

FIG. 15 is a fragmentary perspective view of an extruded mat section and an end connector means having projections thereon which can be inserted into the channels;

FIG. 16 is a fragmentary perspective view showing the end connector of FIG. 15 welded to the mat body;

FIG. 17 is a sectional view taken along the stepped line 17—17 of FIG. 16, illustrating the manner in which the ribs extend into slots in the end connector;

FIG. 18 is a sectional view taken along line 18—18 of FIG. 16;

FIG. 19 is a sectional view taken along line 19—19 of FIG. 17.

Figure 1:
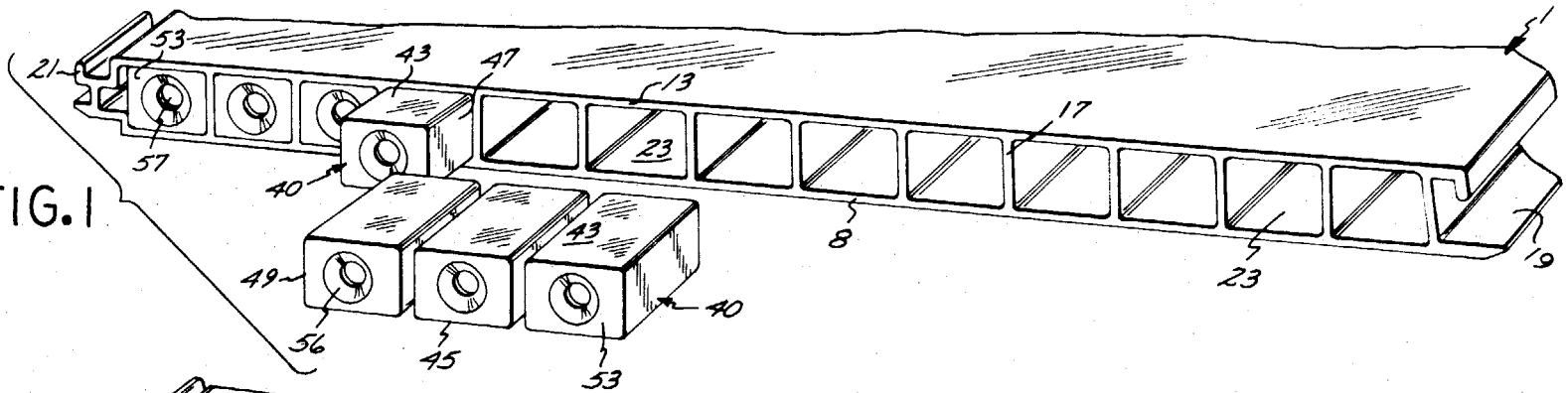
FIG. 1 is a fragmentary perspective view, showing an end of a mat section with the hollow plug means used in reinforcing the mat channels.
Figure 2:
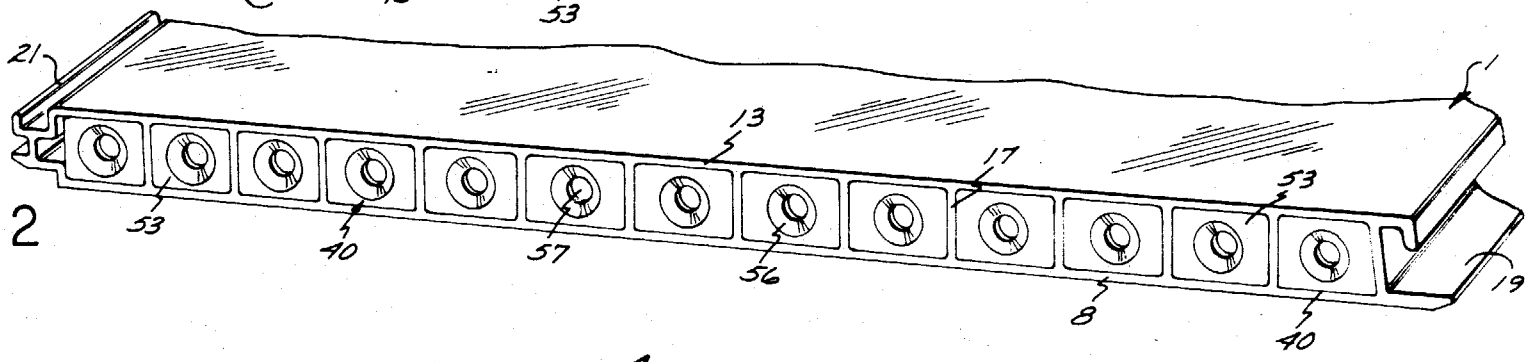
FIG. 2 is a fragmentary perspective view, showing an end of a mat section with the plug means inserted into the channels.
Figure 3:
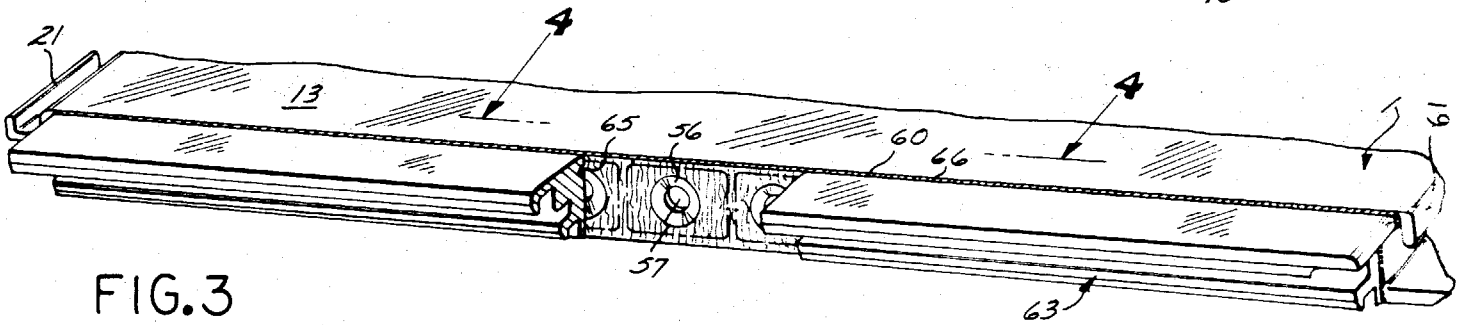
FIG. 3 is a fragmentary perspective view, partly broken away, showing an end connector in welded position on the reinforced mat section.
Figure 4:
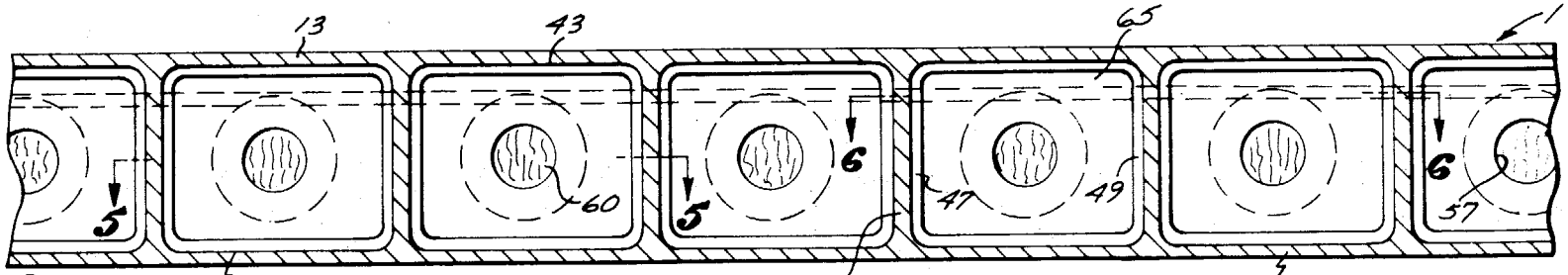
FIG. 4 is a sectional view taken along lines 4—4 of FIG. 3, showing in dashed lines the grooves in the back face of the end connector means relative to the perforations in the end wall of the plug means.
Figure 6:
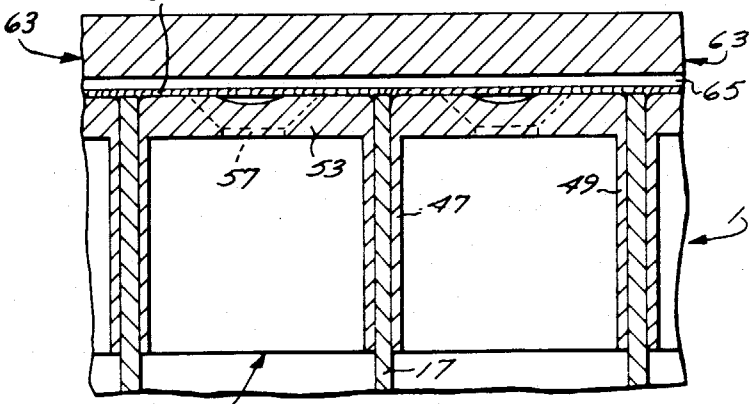
FIG. 6 is a sectional view taken along line 6—6 of FIG. 4, showing the groove in the back face of the end connector means and the vent hole in the end wall of the plug means.

Referring now to the drawings, a metal mat section having an extruded body portion indicated generally at 1 comprises a planar base plate 8, a spaced parallel deck plate 13 supported by a plurality of longitudinally extending ribs 17 which are coextensive with the ends of the plates, and complimentary male and female side connectors 19, 21, respectively, formed on the opposite side edges of the body portion (FIGS. 1 and 2). The end of mat body 1 is reinforced by inserting hollow rectangular boxes or plug means 40 into the cells or channels 23 defined by adjacent ribs and the deck and base plates.

The hollow plug means 40, illustrated in FIG. 1, has peripheral walls comprising top and bottom walls 43, 45, respectively, and vertically extending side walls 47, 49. Closing of one end of the plug means is an end wall 53 having a beveled surface 56 about hole or perforation 57 therein. The cross-section of the plug means conforms closely to that of channel 23 to effect a tight fit of the plug therein, with the clearance from the walls of the channel being just sufficient to permit manual insertion of the plug.

To effect the desired reinforcement of the ends of the mat, a hollow plug is employed whose peripheral walls are from about 0.5 to 1.5, more preferably from about 0.75 to 1 as thick as rib 17, the thickness of end wall 53 of the plug preferably being from about 1 to 2, more preferably from about 1.25 to 1.75 as thick as the ribs. In a typical mat section, for example, where the overall distance between the deck and base plate surfaces is about 1.25 inches and the rib thickness is about 0.14 inch, the plug means employed has an overall length of about 1.75 inches, a peripheral wall thickness of about 0.14 inch, and an end wall thickness of about 0.21 inch.

Figure 8:
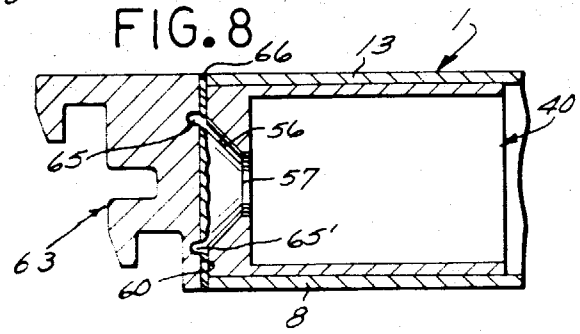
FIG. 8 is a sectional view of the end of a mat section having an end connector means with a pair of air passages formed therein.

After the plug means are inserted into channels 23 with the end walls 53 thereof coextensive with the end of ribs 17, the back face 60 of end connector 63 is positioned in contact with the end of the mat section. The recess or groove 65 extending across the back face 60 of the end connector communicates with apertures 57 in each of the plug means, this groove serving as an air passage between the side edge of the mat and each of the channels 23 therein (FIGS. 3, 4, 6 and 7). In a preferred embodiment illustrated in FIG. 8, a pair of spaced parallel grooves 65 and 65' in rear face 60 of the end connector both communicate with the aperture 57 in plug means 40.

Figure 5:
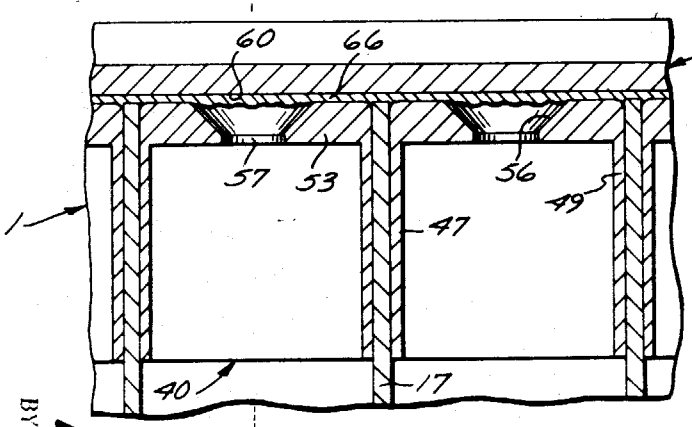
FIG. 5 is a sectional view taken along line 5—5 of FIG. 4, showing the end wall of the plug means welded to the end connector.
Figure 7:
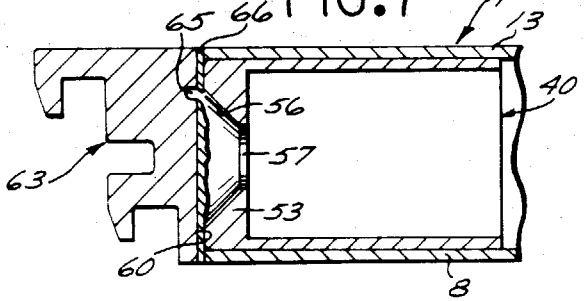
FIG. 7 is a sectional view taken along line 7—7 of FIG. 5, showing the air passage through the end connector means.
Figure 9:
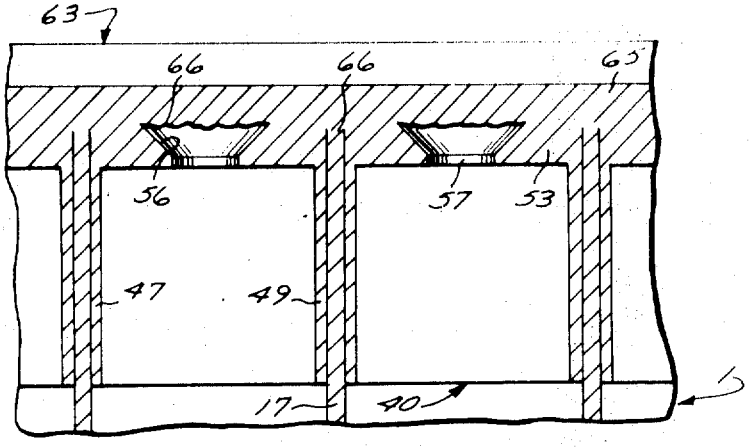
FIGS. 9 and 10 are cross-sectional views through the end of a mat section showing the integral structure obtained by using an electron beam to weld the end connector means to the mat body.
Figure 10:
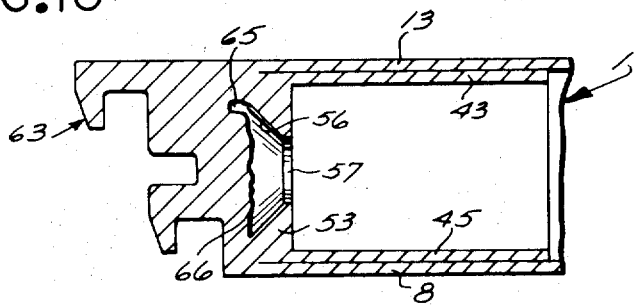
Figure 11:
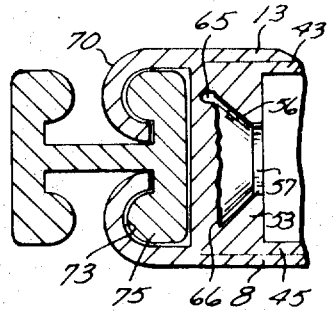
FIG. 11 is a fragmentary sectional view of the end of a mat section having attached thereto an improved end connector with a coupling bar inserted therein.

The reinforced mat assembly with end connectors 63 secured thereto is then placed in a vacuum chamber, the pressure in the chamber reduced to about 100 microns, and a high desnity electron beam is passed transversely through the mat along the juncture between the end connector and the body of the mat to produce weld 66 therebetween. By utilizing an electron beam welder such as described in U.S. Patent Nos. 3,187,216, 3,197,699, 3,274,425, and 3,365,091, the entire rear face 60 of end connector 63 is fused to the walls 53, the end of ribs 17, and the end of plates 8 and 13. It has been found that the beam of electrons generates sufficient heat during the welding operation to also fuse an edge of the peripheral walls of plug 40 to the interior of channel walls 8, 13 and 17 (FIGS. 5, 9 and 10).

Suitable end connectors for use herein are preferably metal extrusions such as those shown in U.S. Patent No. 3,172,508. Although any of the conventional end connectors can be used with the reinforced matting of the present invention, it is preferred to employ an extruded end connector 70 having a socket 73 into which is inserted a coupling bar 75, a fuller description of this end connector being found in U.S. Patent No. 3,348,459 which is included herein by reference. The body portion of the mat as well as the end connectors and plug means can be extruded from any light metal. Suitable light metals are, for example, aluminum and the alloys thereof.

Figure 12:
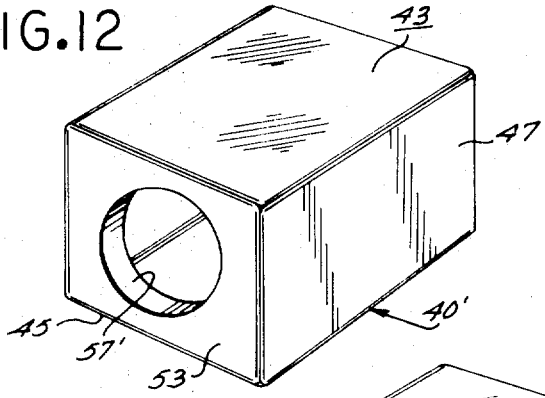
FIGS. 12, 13 and 14 are perspective views of several plug means which can be used in reinforcing the channels in the mat.
Figure 13:
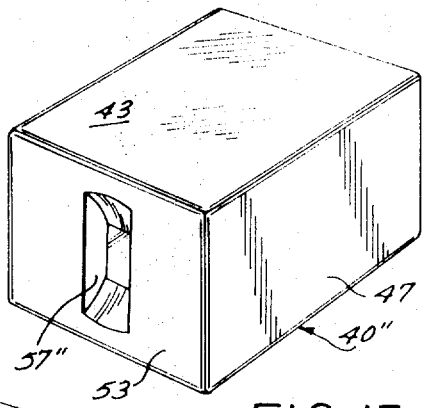
Figure 14:
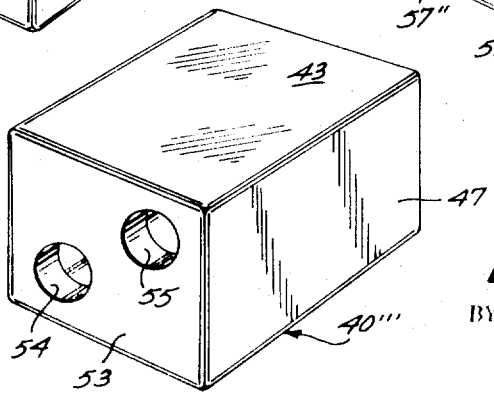

The end wall 53 of the plug means used in reinforcing the mat can have one or more perforations therein to facilitate the venting of air from channels 23 during the electron beam welding. Suitable, for example, are plug means 40', FIG. 12, having a relatively large circular hole 57' in walls 53, or plug means 40'', FIG. 13, having a rectangular hole 57'' milled in wall 53, or else, a plug means 40''', FIG. 14, with two holes 54, 55 in end wall 53. Under conditions of service where an electron beam welded mat having a partial vacuum within the channels can be tolerated, it is unnecessary to use a plug with a perforation in its end wall. With heavy duty mat, for example, any reduction in strength due to a partial vacuum in the channels is more than compensated for by the increased strength of end wall 53 and the added weld area. If desired, a solid plug can be used to reinforce the end of the channels.

Although the supporting ribs are shown herein extending vertically between the deck and base plates, reinforcement of matting according to the present invention can also be achieved where the ribs extend at an angle to these plates. It is only necessary that the cross-sectional configuration of the plug means conform closely to that of the channel.

By reinforcement of a mat body with the plug means of the present invention, and by using an electron beam in welding the end connector to the mat, the weld area is at least doubled and in most cases tripled, depending upon the size of the aperture in the end wall 53. In a series of impact tests with reinforced matting of the present invention, it is found that the fatigue life of the weld and the mat is increased by as much as three hundred percent. The matting of the present invention is therefore especially suitable in military applications where reliability is the price consideration since it may not always be possible to regularly inspect and repair mating in service.

In another preferred embodiment, reinforcement of the end of channels 23 is achieved by utilizing an end connector means 80 having a plurality of spaced, parallel upper and lower finger-like projections 83, 85, respectively, which can be inserted into channels 23 (FIGS. 15 to 19). When fully inserted into the channels 23, as shown in the cutaway section of FIG. 16, the upper projection 83 is in slidable contact with and reinforces the under side of deck plate 13 between adjacent ribs 17, while lower projection 85 is in slidable contact with and reinforces base plate 8 intermediate the adjacent ribs.

A plurality of notches or grooves 86, FIGS. 15 and 17, separate each pair of projections 83, 85, the ribs 17 preferably extending into these grooves beyond rear vertical face 84 of end connector 80. The grooves 86 can be cut into extruded end connector 80 to any desired depth, it being preferred that these grooves extend a sufficient depth into the end connector so that face 84 thereof will lie a short distance within channel 23. To satisfactorily reinforce light weight matting, the projections 83, 85 extend into the channels a distance at least equal to the over-all mat thickness. However, with medium or heavy duty matting, the desired reinforcement of the mat ends is obtained using finger-like projections which extend into the channels only a fraction of the over-all mat thickness.

To facilitate evacuation of channels 23 when welding with an electron beam under a high vacuum, a notch or groove 88 which forms an air vent is cut in the end of each rib as well as in the outer wall of the male side connector 19. When the pressure in the vacuum chamber is reduced to about 100 microns at the outset of the welding operation, air in the channels 23 flows out through grooves 88. After end connector 80 is secured to the mat by weld 90, air at atmospheric pressure is admitted into the channels through the same grooves. In most cases, it is preferred to then weld close the external groove in the side connector 19 to prohibit entry of water or other debris into the body of the mat.

From the foregoing description, one skilled in the art can easily ascertain the essential characteristics of this invention, and without departing from the spirit and the scope thereof, can make various changes and modifications of the invention to adapt it to various usages and conditions. Consequently, such changes and modifications are properly, equitably, and intended to be, with the full range of equivalence of the following claims.

What I claim is:

1. A reinforced mat section comprising an extruded body portion having deck and base plates spaced apart by a plurality of spaced ribs extended between ends of said section and forming a plurality of cells, complementary side connectors formed integral with the body portion, hollow plug means fitting into ends of each of said cells with each of said plugs having an outer end wall, and end connector means extending across and being welded to the end of said cells and to the end wall of said plug means, whereby the outer end of said plug means becomes welded to the end of said cells and to the end connector means during the welding process.

2. The mat section as defined by claim 1, wherein a perforation in the end wall of the plug means communicates with a groove in the end connector means, said groove extending across the end connector means to an end thereof, thereby forming an air passage for venting of the cells.

3. The mat section as defined by claim 1, wherein the plug means is rectangular in cross-section and extends into the cell a distance at least equal to the over-all mat thickness.

4. The mat section as defined by claim 1, wherein the distance the plug means extends into the channel is from about 1.25 to 2 times as great as the over-all mat thickness.

5. The mat section as defined by claim 1, wherein the body portion is extruded from a light metal selected from the group consisting of aluminum and the alloys thereof.

6. A reinforced mat section comprising: an extruded body portion, and an end connected means secured to the end of the body portion, said body portion having deck and base plates spaced apart by a plurality of parallel ribs extending longitudinally between the ends of the plates with hollow cells being defined by said ribs and plates, said end connector means having a plurality of integrally formed top and bottom fingers, said fingers being inserted into each of said cells, and the end of said cells being welded to the end connector means.

7. The mat section as defined by claim 6, wherein a pair top and bottom finger extend into each of the cells, with the top finger being in sliding contact with the deck plate and the bottom finger in sliding contact with the base plate.

8. The mat section as defined by claim 6, wherein the fingers extend into the cell a distance at least equal to the over-all mat thickness.

9. The mat section as defined by claim 8, wherein the distance the fingers extend into the cell is from about 1.25 to 2 times as great as the over-all mat thickness.

10. The mat section as defined by claim 6, wherein the ends of the ribs have a groove therein which forms a passage between the inner wall of the end connectors and the ribs thereby, to facilitate venting of air from the cells.

11. The mat section as defined by claim 6, wherein the body portion is extruded from a light metal selected from the group consisting of aluminum and the alloys thereof.

*12. A reinforced mat section comprising an extruded body portion having deck and base plates spaced apart by a plurality of ribs extending longitudinally between the ends of said plates with hollow cells being defined by said ribs and plates; an end connector means rigidly joined to an end of said deck and base plates and said ribs along the length thereof; and strengthening means positioned in each of said hollow cells between said ribs for strengthening said ribs with respect to buckling, one entire end of each of said strengthening means being permanently rigidly joined directly to said end connector means.*

*13. The mat section as defined by claim 12 wherein said body portion is extruded from a light metal selected from the group consisting of aluminum and the alloys thereof.*

*14. The mat section as defined by claim 12 wherein said end connector means is of a solid one-piece construction and is provided with a socket into which a coupling bar can be inserted in keying engagement.*

*15. The mat section as defined by claim 12 wherein said strengthening means are integral projections from said connector means.*

*16. The mat section as defined by claim 12 wherein said end of said ribs is welded to said end connector means.*

*17. The mat section as defined by claim 16 wherein said strengthening means is welded to said end connector means.*

*18. The mat section as defined by claim 17 wherein said deck plate and said base plate are welded to said end connector means along their lateral end in the same plane as the weld joint joining said strengthening means to said end connector means.*

*19. The mat section as defined by claim 18 wherein said deck plate, said base plate, said ribs and said strengthening means are joined together by a single continuous weld joint.*

*20. The mat section as defined by claim 18 wherein said end connector means is of a solid one-piece construction and closes the ends of said hollow cells, and is attached to said body portion and said strengthening means by a single continuous weld connection between said deck and base plates, said ribs, said strengthening means and said end connector means which separately seals each of the hollow cells in cooperation with said weld connection.*

*21. The mat section as defined by claim 18 having end connector means at both ends thereof, one being male and the other female, each of said end connector means having an irregular front wall surface which includes a horizontally disposed recess open at one side and locked about*

*midway between the upper and lower surfaces of said end connector means, the front wall of said male end connector means having a first depending flange located above and forward of its said recess and a second depending flange located below and rearward of said first flange, the front wall of said female connector having a first overwide groove open upwardly and located above and somewhat rearward of its said recess for receiving said first flange of a male end connector of an adjoining unit and having a second overwide groove open upwardly and located below and forward of its recess for receiving said second flange of said male end connector means of the adjoining unit, the open sided recesses of said male and female end connectors when adjoining units are interlocked forming a substantially closed slot for receiving a locking bar.*

References Cited

The following references, cited by the Examiner, are of record in the patented file of this patent or the original patent.

UNITED STATES PATENTS

| | | | |
|---|---|---|---|
| 3,172,508 | 3/1965 | Doering | 52—579 |
| 3,319,543 | 5/1967 | Braeuninger | 94—13 |
| 3,377,931 | 4/1968 | Hilton | 94—13 |

JACOB L. NACKENOFF, Primary Examiner